Sept. 6, 1932.  H. W. KING  1,876,244
LIQUID DEPTH INDICATING DEVICE

Filed Oct. 30, 1922

Inventor
Horace W. King,

Attorney

Patented Sept. 6, 1932

1,876,244

UNITED STATES PATENT OFFICE

HORACE W. KING, OF ANN ARBOR, MICHIGAN, ASSIGNOR TO KING-SEELEY CORPORATION, OF ANN ARBOR, MICHIGAN, A CORPORATION OF MICHIGAN

LIQUID DEPTH INDICATING DEVICE

Application filed October 30, 1922. Serial No. 598,043.

The invention relates to liquid depth indicating devices and is particularly applicable for measuring the depth of the lubricating oil in the crank case of an internal combustion engine. One of the objects of the invention is the provision of a simple device for measuring the depth of the oil in the crank case and for also indicating whether the oil pump is working properly. Another object is the provision of a device in which the air chamber is automatically replenished with air. Further objects of the invention reside in the novel features of construction and combinations and arrangements of parts as more fully hereinafter set forth.

Figure 1:
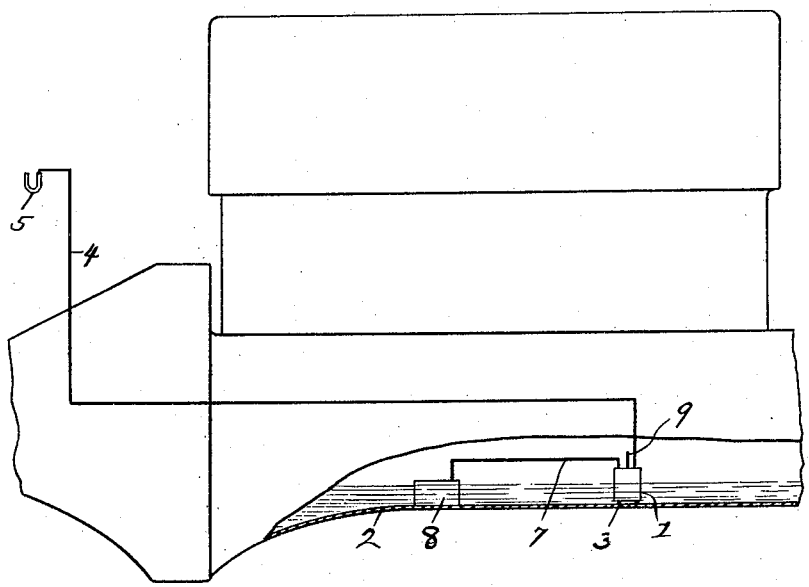
Figure 1 is a diagrammatic side elevation partly broken away of an internal combustion engine with a liquid depth indicating device embodying my invention applied.
Figure 2:
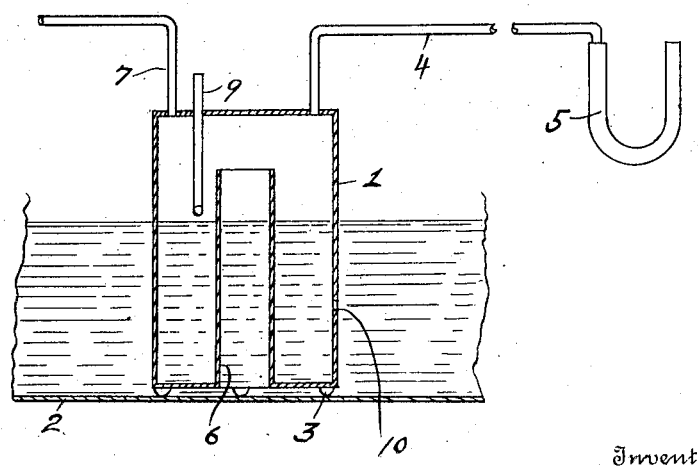
Figure 2 is an enlarged cross section through the liquid depth indicating device.

1 is an outer tube closed at its upper and lower ends and located within the crank case 2 of an internal combustion engine, the lower end of this tube being slightly spaced above the bottom of the crank case by suitable means such as the lugs 3 to permit of the passage of the oil therebelow. The upper end of the outer tube is located above the normal level of the oil in the crank case and has connected thereto the pipe 4 for placing the interior of the outer tube in communication with the pressure gage 5. 6 is an inner tube located concentrically within the outer tube and having an open upper end communicating with the interior of the outer tube 1 above the normal level of the oil and an open lower end communicating with the oil at the full depth to be measured, which in the present instance is the height of the lower closed end of the outer tube above the bottom of the crank case. 7 is an oil discharge pipe communicating with the oil pump 8 and communicating with the interior of the outer tube, this pipe in the present instance being connected to the upper closed end of the outer tube laterally beyond the inner tube.

For replenishing the air chamber formed within the upper end of the outer tube 1 with air, I have provided the air pipe 9 leading from a point above the upper closed end of the outer tube and communicating with the interior of this outer tube at a point above the normal level of the oil in the crank case and below the upper open end of the inner tube 6 and I have also provided the restricted outlet opening 10 in the wall of the outer tube below the normal level of the oil in the crank case for placing the interior of this outer tube in communication with the oil. The restricted outlet opening 10 has a smaller cross sectional area than that of the oil discharge pipe 7 and the volume inclosed between the outer and inner tubes from the point of communication of the air tube with the outer tube to the point of communication of the inner tube with the outer tube is preferably greater than the volume within the inner tube from its upper open end to its lower open end.

Assuming that the internal combustion engine is at rest, the level of the oil within the inner tube 6 and outer tube 1 is the same as the normal level of the oil in the crank case owing to the fact that each tube communicates with the oil in the crank case respectively through its lower open end and the restricted outlet opening 10, the gas pressure on the surfaces of the liquid in the tubes 1 and 6 being the same as in the crank case by reason of the vent 9. Since the opening at the lower end of the air tube 9 is located above the level of the oil, atmospheric air may freely enter into the air chamber through this air tube. Assuming the engine to begin running, oil is forced by means of the oil pump 8 through the oil discharge pipe 7 into the outer tube 1 and this oil as it rises within the outer tube owing to the fact that the outlet opening 10 is restricted, closes the opening at the lower end of the air tube 9, sealing the same. The oil continues to rise until it flows over the open upper end of the inner tube 6 when it passes downwardly through this inner tube. The rising oil displaces the air which previously occupied the space between the outer and inner tubes and this air in turn displaces the oil within the inner tube down to its point of communication with the oil in the crank case. As a consequence, the pressure gage which communicates with the air chamber may be calibrated to indicate the depth of the oil in the crank case owing to the fact that the pressure of air in the air chamber is dependent upon the height or the volume of oil in the inner tube which is displaced and consequently dependent upon the depth of oil in the crank case. However, it is apparent that the device may be built so that in operation all of the oil is not displaced from the inner tube, in which event the depth measured is that between the surface of the oil in the crank case and the surface of the oil in the inner tube. After the engine stops, the oil flows from the outer tube through the restricted outlet opening into the crank case, and oil also flows into the inner tube from the crank case until the same level of oil throughout is obtained. The air tube is now open for placing the air chamber in communication with the atmospheric air.

Thus, when the pump is operating, the gage indicates the amount of oil in the crank case and when the pump is not operating the gage shows a zero reading. The device thus serves the double purpose of indicating the amount of oil and of showing whether the pump is operating.

What I claim as my invention is:

1. In a liquid depth indicating device, the combination with an air chamber having a closed lower end, said air chamber having a closed upper end above the normal level of the liquid, and a pressure gage communicating with said air chamber above the normal level of the liquid, of a second chamber communicating with the liquid at the full depth to be measured and with said first-mentioned chamber above the normal level of the liquid, and means for feeding the liquid into said first-mentioned chamber, the volume of air displaced by the entering liquid being sufficient to displace the liquid in said second chamber to a predetermined level.

2. In a liquid depth indicating device, the combination with a chamber having a closed lower end, said chamber having a closed upper end above the normal level of the liquid, and having a liquid outlet below the level of the liquid, and a pressure gage communicating with said chamber above the normal level of the liquid, of a second chamber communicating with the liquid at the full depth to be measured and with said first-mentioned chamber at a point above the normal level of the liquid, means for feeding the liquid into said first-mentioned chamber, and means communicating with said first-mentioned chamber above the normal level of the liquid and below the point of communication of said chambers and dependent upon the non-feeding of the liquid for replenishing said first-mentioned chamber with air.

3. In a liquid depth indicating device, the combination with a chamber having a closed lower end, said chamber having a closed upper end above the normal level of the liquid, and a pressure gage connecting into said chamber near its upper end, of a second chamber communicating with said first-mentioned chamber above the normal level of the liquid and with the liquid at the full depth to be measured, the portions of said chambers above the normal level of the liquid being adapted to contain air, and means for feeding the liquid into said first-mentioned chamber to displace some of the air therein into said second chamber and displace the liquid in said second chamber down to its point of communication with liquid outside the same.

4. In a liquid depth indicating device, the combination with a chamber having a closed lower end, said chamber having a closed upper end above the normal level of the liquid and having a liquid outlet located below the level of the liquid, and a pressure gage connecting into said chamber above the normal level of the liquid, of a second chamber communicating with said first-mentioned chamber above the level of the liquid and with the liquid at the full depth to be measured, the portions of said chambers above the level of the liquid being adapted to contain air, means for feeding liquid into said first-mentioned chamber to displace some of the air therein into said second chamber and displace the liquid in said second chamber, and a tube having one end open to the atmosphere and the other end communicating with said first-mentioned chamber above the normal level of the liquid and below the point of communication of said first and second-mentioned chambers for facilitating the automatic replenishing of said first-mentioned chamber with air.

5. In a liquid depth indicating device, the combination with a closed chamber extending above the normal level of the liquid and having a liquid outlet located below the level of the liquid and a pressure gage in communication with said chamber, of a second chamber communicating with the liquid and with said first-mentioned chamber above the normal level of the liquid, means for feeding liquid into said first-mentioned chamber, and an air tube communicating with said first-mentioned chamber above the normal level of the liquid and below the point of communication of said chambers.

6. In a liquid depth indicating device, the combination with a tube closed at its upper and lower ends and having a restricted discharge opening for the liquid located below the level of the liquid, of a pressure gage in communication with the interior of said tube near its upper end, a tube communicating with the liquid at the full depth to be measured and with the interior of said first-mentioned tube above the normal level of the liquid, means for feeding liquid into said first-mentioned tube at a greater rate than the liquid discharges through said discharge opening, and an air tube communicating with the interior of said first-mentioned tube above the normal level of the liquid and below the point of communication of said second-mentioned tube with said first-mentioned tube.

7. The combination with an engine crank case containing oil, of an outer tube having a closed lower end, said tube having a closed upper end above the normal level of the oil, and a restricted discharge opening below the normal level of the oil, an inner tube extending upwardly within said outer tube to a point above the normal level of the oil and communicating with the oil at the full depth to be measured, an oil supply inlet for said outer tube, and an air conduit for said outer tube opening thereinto at a point above the normal level of the oil and below the point of communication of said inner tube and with said outer tube, the volume inclosed between the outer and inner tubes from the point of communication of said air conduit with said outer tube to the point of communication of said inner tube with said outer tube being at least as great as the volume inclosed within said inner tube between its point of communication with the oil outside the same and the level of the oil therewithin.

8. The combination with an engine crank case containing oil and an oil pump, of a device for indicating the depth of the oil in the crank case and also for indicating the operation of the pump, said device including a chamber closed at its upper and lower ends and having a discharge opening for the oil located below the normal level thereof, pressure indicating means communicating with said chamber near its upper end, a second chamber communicating with the liquid at the full depth to be measured and with said first-mentioned chamber above the normal level of the oil, and a connection for establishing communication between the pump and first-mentioned chamber and through which oil is fed to said chamber.

In testimony whereof I affix my signature.

HORACE W. KING.